United States Patent
Teder

(12)
(10) Patent No.: US 6,262,407 B1
(45) Date of Patent: Jul. 17, 2001

(54) MOISTURE SENSOR WITH AUTOMATIC EMITTER INTENSITY CONTROL

(75) Inventor: Rein S. Teder, Bloomington, MN (US)

(73) Assignee: Libbey-Owens-Ford Co., Toledo, OH (US)

( * ) Notice: Subject to any disclaimer, the term of this patent is extended or adjusted under 35 U.S.C. 154(b) by 0 days.

(21) Appl. No.: 09/223,955

(22) Filed: Dec. 31, 1998

(51) Int. Cl.$^7$ .................................................. G01J 1/32
(52) U.S. Cl. .................. 250/205; 250/227.25; 318/443; 318/483
(58) Field of Search .................................. 250/205, 574, 250/227.25, 341.8; 318/443, 444, 483; 340/602, 604, 609

(56) References Cited

U.S. PATENT DOCUMENTS

| | | | |
|---|---|---|---|
| 4,355,271 | 10/1982 | Noack | 318/480 |
| 4,481,450 | 11/1984 | Watanabe et al. | 318/444 |
| 4,620,141 | 10/1986 | McCumber et al. | 318/483 |
| 4,856,011 | * 8/1989 | Shimada et al. | 372/38 |
| 5,059,877 | 10/1991 | Teder | 318/444 |
| 5,225,669 | 7/1993 | Hasch et al. | 250/214 AL |
| 5,239,244 | 8/1993 | Teder | 318/444 |
| 5,436,541 | 7/1995 | Mangler et al. | 318/483 |
| 5,568,027 | 10/1996 | Teder | 318/483 |
| 5,914,484 | * 6/1999 | Tawarayama et al. | 250/205 |

* cited by examiner

Primary Examiner—Que T. Le
Assistant Examiner—Thanh X. Luu
(74) Attorney, Agent, or Firm—Marshall & Melhorn, LLC

(57) ABSTRACT

An automatic intensity control unit for use in a moisture sensor which senses moisture on the surface of a transparent material. The moisture sensor includes one or more emitters for producing an emitter signal which is influenced by moisture on the transparent material, and one or more detectors for receiving the emitter signals. The automatic intensity control unit adjusts the intensity of the emitter signals to accommodate transparent materials having different transmittances. The automatic intensity control unit includes a comparator for comparing the intensity the emitter signals received by the detectors with a predetermined reference signal and a counter communicating with the comparator for producing a counter output. The automatic intensity control unit also includes an emitter driver for providing power to the emitters in an amount which determines the intensity of the emitter signals, and an emitter intensity control signal generator communicating with the counter and the emitter driver for controlling the intensity of the emitter signals.

17 Claims, 4 Drawing Sheets

MOISTURE SENSOR WITH AUTOMATIC EMITTER INTENSITY CONTROL

BACKGROUND OF THE INVENTION

The present invention relates generally to an optical moisture sensor for detecting moisture on the surface of a transparent material, and more particularly, to a servo circuit for self adjusting the moisture sensor for use with different transparent materials having different transmittances.

The accumulation of moisture on transparent materials, such as glass or plexiglass, can obstruct a person's view through the material. Motor vehicles have long been equipped with motor-driven windshield wipers for clearing the moisture from the external surface of the windshield, at least within the driver's field of vision, and generally over a larger area so as to enhance one's vision through the windshield.

In most vehicles today, the windshield wiper system includes multi-position or variable speed switches which allow the driver to select a wide, if not an infinitely variable, range of speeds to suit conditions. Wiper controls are manually operated and typically include a delay feature whereby the wipers operate intermittently at selected time delay intervals.

Wiper control systems have recently been developed which include a moisture sensor mounted on one of the vehicle windows to automatically activate the wiper motor when moisture is deposited upon the surface of the window. The wiper control system including the moisture sensor are most typically mounted on the windshield, although the system may be mounted on the rear window or any other glass surface intended to be cleared of moisture. Such wiper control systems free the driver from the inconvenience of frequently adjusting the wiper speed as the driving conditions change.

Wiper control systems have used a number of different technologies to sense the moisture conditions encountered by a vehicle, including conductive, capacitive, piezoelectric, and optical sensors. Optical sensors operate upon the principle that a light beam is diffused or deflected from its normal path by the presence of moisture on the exterior surface of the windshield. The systems which employ optical sensors have the singular advantage that the means of sensing disturbances in an optical path is directly related to the phenomena observed by the driver (i.e., disturbances in the optical path that affords the driver vision). McCumber et al. (U.S. Pat. No. 4,620,141) disclose an optical moisture sensor which triggers a sweep of the wiper blades in response to the presence of water droplets on the exterior surface of a windshield.

In typical optical moisture sensors, a light signal from an emitter is directed into the windshield at an angle of approximately forty-five degrees with respect to the windshield. The light signal is then reflected by the outer surface of the windshield at approximately a forty-five degree angle and the reflected signal is directed into a detector. The presence of moisture on the surface of the windshield affects the reflection of the light signal at the outer surface of the windshield resulting in a reflected signal having a lower amplitude. The detector receives the reflected signal and produces an output signal which indicates the change in amplitude of the reflected emitter signal. The detector output signal is electronically processed by the moisture sensor which determines when to actuate the windshield wipers.

Moisture sensors, especially those used in automobiles, typically operate under a wide range of temperatures which can affect the electrical values of the electronic components. In addition, the electrical values may change as the electronic components age. These changes in the values of the electrical components can affect the strength of the emitter signal, which changes the detector output and ultimately affects the performance of the moisture sensor. It is desirable for the moisture sensor to compensate for these changes in component values and continue to operate within the desired specifications.

Additionally, the moisture sensor may be used on different automobiles having different glass transmittances. The transmittance of the glass determines the amount of light which will pass through the glass. Therefore, the transmittance of the glass affects the strength of the reflected emitter signal reaching the detector. For example, modern solar-control windshields, such as windshields sold under the trademark "EZ-KOOL" commercially available from Libbey-Owens-Ford Co., absorb much of the infrared rays used by many optical moisture sensors drastically reducing the strength of the reflected emitter signal. It is desirable to adjust the intensity of the emitter signal in relation to the transmittance of the glass to achieve a reflected signal having a predetermined amplitude regardless of the glass transmittance.

It is known to provide automatic intensity control for moisture sensors (see Mangler, et al. U.S. Pat. No. 5,436,541). Teder (U.S. Pat. No. 5,059,877) teaches an automatic intensity control circuit which uses an analog linear servo. The Teder '877 patent teaches using an analog integrating device for adjusting the intensity of the emitter signal such that the amplitude of the detector output signal matches a threshold signal. The circuit is a linear circuit and thus the intensity of the emitter signal is changed by an amount which is proportional to the difference between the amplitude of the detector output signal and the threshold. An analog automatic intensity control is taught by Mangler, et al in U.S. Pat. No. 5,436,541. While the analog circuit performs adequately, it is desirable to provide an automatic intensity control circuit which is less expensive and which can be more effectively adapted to digital control.

Hasch et al. (U.S. Pat. No. 5,225,669) teaches using digital components to implement an automatic intensity control unit for moisture sensors. The Hasch device attempts to maintain the amplitude of the detector output signal within a target range. The target range includes an upper threshold defined by a first comparator and a lower threshold defined by a second comparator. The intensity of the emitter signal is changed when the amplitude of the detector output signal falls outside of the target range. When the amplitude of the detector output signal stays within the target range, the intensity of the emitter signal is not changed. An automatic intensity control unit as practiced by Hasch requires electrical components to establish two separate thresholds. Furthermore, the system permits the detector output current to fall anywhere within the prescribed range, rather than holding it to a single precise value. This introduces the potential for variation of sensor sensitivity. It is desirable to reduce the components necessary to implement an automatic intensity control unit while improving the sensitivity of the moisture sensor.

SUMMARY OF THE INVENTION

An automatic intensity control unit for use in a moisture sensor which senses moisture on the surface of a transparent material. The moisture sensor includes one or more emitters for producing an emitter signal which is influenced by moisture on the transparent material, and one or more detectors for receiving the emitter signals and communicating with moisture sensing circuitry for determining the presence of moisture. The automatic intensity control unit adjusts the intensity of the emitter signals to accommodate transparent materials having different transmittances and changes in electronic components. The automatic intensity control unit includes a comparator for comparing the intensity the emitter signals received by the detectors with a predetermined reference signal and a counter communicating with the comparator for producing a counter output. The value of the counter output preferably changes linearly over a predetermined range.

The automatic intensity control unit also includes an emitter intensity control signal generator communicating with the counter for controlling the intensity of the emitter signals. The emitter intensity control signal increases the intensity of the emitter signals when the intensity of the emitter signals received by the detectors is less than the reference signal and decreases the intensity of the emitter signals when the intensity of the emitter signals received by the detectors is more than the reference signal. Operating in such a fashion, the control will constantly re-adjust the emitter signal strength so that the received intensity is just above or below the desired level. The resulting precision in holding the set point permits the moisture sensor to function consistently under different conditions.

The automatic intensity control unit further includes an emitter driver communicating with the emitter intensity control signal generator for providing power to the emitters in an amount which determines the intensity of the emitter signals. The emitter driver responds to the linearly increasing or decreasing emitter intensity control signal by exponentially increasing or decreasing respectively the amount of power provided to the emitters. This exponential response permits the system to function with stability and precision over a wide range.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
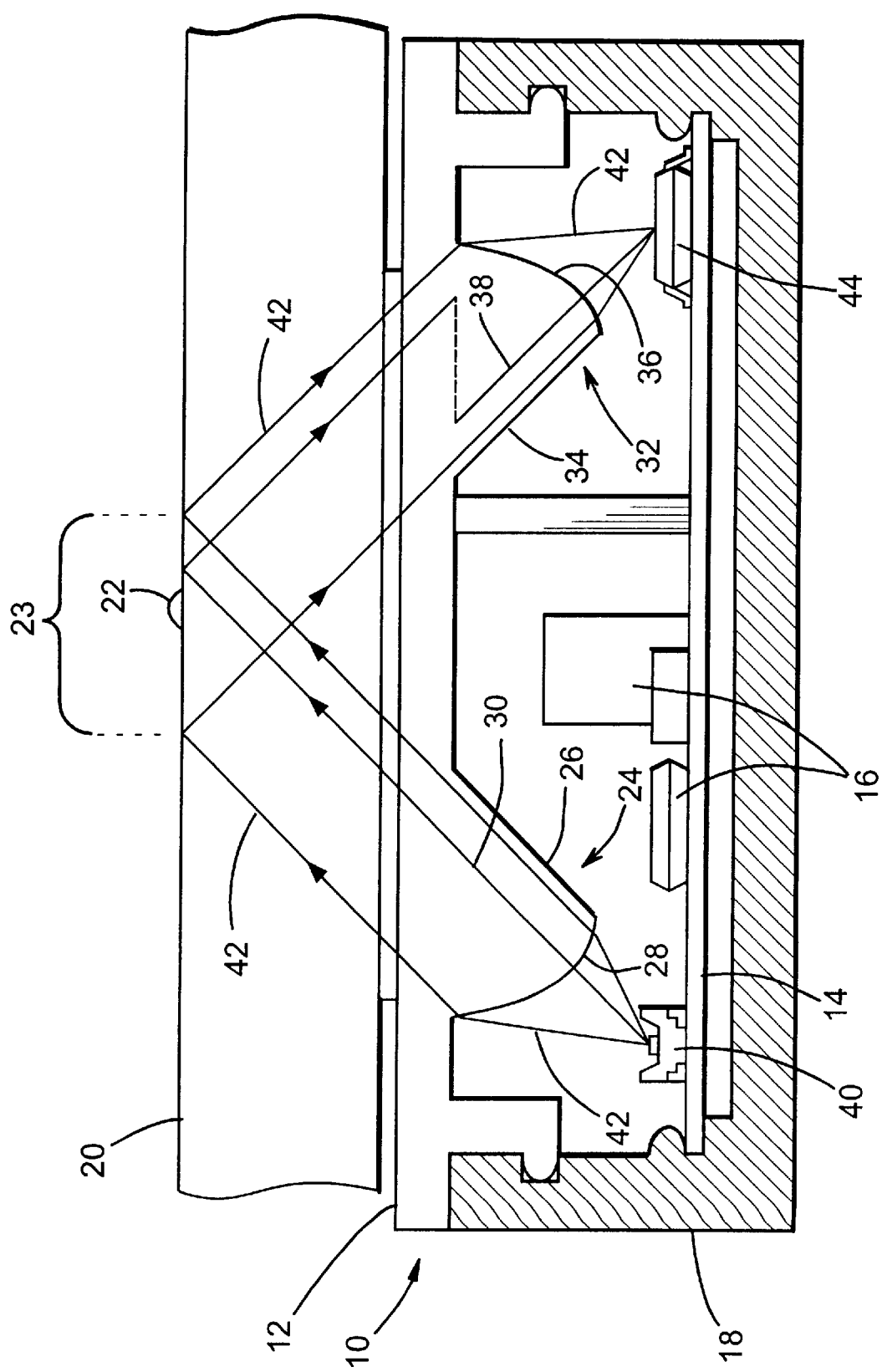
FIG. 1 is a sectional elevational view of a moisture sensor mounted on the inner surface of the windshield in accordance with the invention.

Referring now to FIG. 1, an optoelectronic moisture sensor is shown generally at 10. The moisture sensor includes a coupler 12, a circuit board 14 for mounting electronic components 16, and a sensor housing 18 attachable to the coupler 12 for enclosing the circuit board 14.

The coupler 12 is secured to a first surface of a transparent material 20 for the optical detection of moisture 22 on the oppositely disposed, second surface of the transparent material. The transparent material 20 is preferably glass, such as an automotive windshield or freezer door, although the moisture sensor may be used to detect moisture on plexiglass, plastic or any other transparent material.

The coupler 12 includes a collimator 24 including a collimating body 26 extending from the coupler and a collimating lens 28 disposed adjacent to the collimating body. The collimating lens 28 has an optical axis 30 which extends through the collimating body 26 at a forty-five degree angle with respect to the inner surface of the glass 20. The coupler 12 further includes a focuser 32 having a focusing body 34 extending from the coupler and a focusing lens 36 disposed adjacent to the focusing body. The focusing lens 36 has an optical axis 38 which extends through the focusing body 34 at a forty-five degree angle with respect to the inner surface of the glass 20.

A signal emitter 40 disposed on the circuit board 14 adjacent the collimator 24 for emitting a signal indicated at 42. The signal emitter 40 is preferably an optoelectronic device, such as an infrared light-emitting diode, although any suitable signal emitter may be used. The emitted signal 42 is preferably an infrared radiation signal, that is infrared light, although any suitable signal may be used. A detector 44 is disposed on the circuit board 40 adjacent the focuser 32. The detector 44 is preferably a photodiode, although any suitable detector for receiving the emitter signal 42 may be used.

During operation of the moisture sensor, the emitter 40 emits an infrared signal 42 which travels to the collimating lens 28 of the collimator 26. The emitted signal 42 is collimated into a collimated beam which travels along the optical axis 30 and into the glass 20 at a forty-five degree angle with respect to the inner surface of the glass. The collimated signal 42 strikes the outer surface of the glass 20 at a sensing region 23 where the presence of moisture can be detected. The collimated signal 42, or at least a portion of the signal is then reflected back through the glass 20 and into the focusing body 34 at a forty-five degree angle with respect to the glass. The focusing lens 36 focuses the reflected signal 42 onto the detector 44. If moisture 22 has accumulated on the windshield in the sensing region 23, not all of the collimated light beam 42 will be reflected back to the focusing body 34 and the detector 44 will produce a signal representative of the amount of light which is detected. The moisture sensing circuitry 16 receives the detector signal and interprets the change in the signal as the presence of moisture and controls the wipers accordingly. Although a single emitter 40 and detector 44 are shown, preferably, a plurality of emitters 40 and detectors 44 are used and the detectors are capable of receiving the emitter signals from more than one emitter.

Additional details concerning the operation of the optical portion of the moisture sensor and the interface with the wiper control system may be obtained from U.S. Pat. Nos. 4,620,141; 5,059,877; 5,239,244; and 5,568,027, and U.S. application Ser. No. 08/951,922 filed Oct. 16, 1997. To the extent any such details may be necessary to complete the descriptions and accounts necessary for purposes of the present application, these references are deemed to be incorporated by reference herein.

While the moisture sensor described above is an optoelectronic moisture sensor, any suitable moisture sensor may be used in which the intensity of the emitted signal as received by a detector for detecting the presence of moisture on the surface of a transparent material is affected by the properties of that transparent material.

Figure 2:
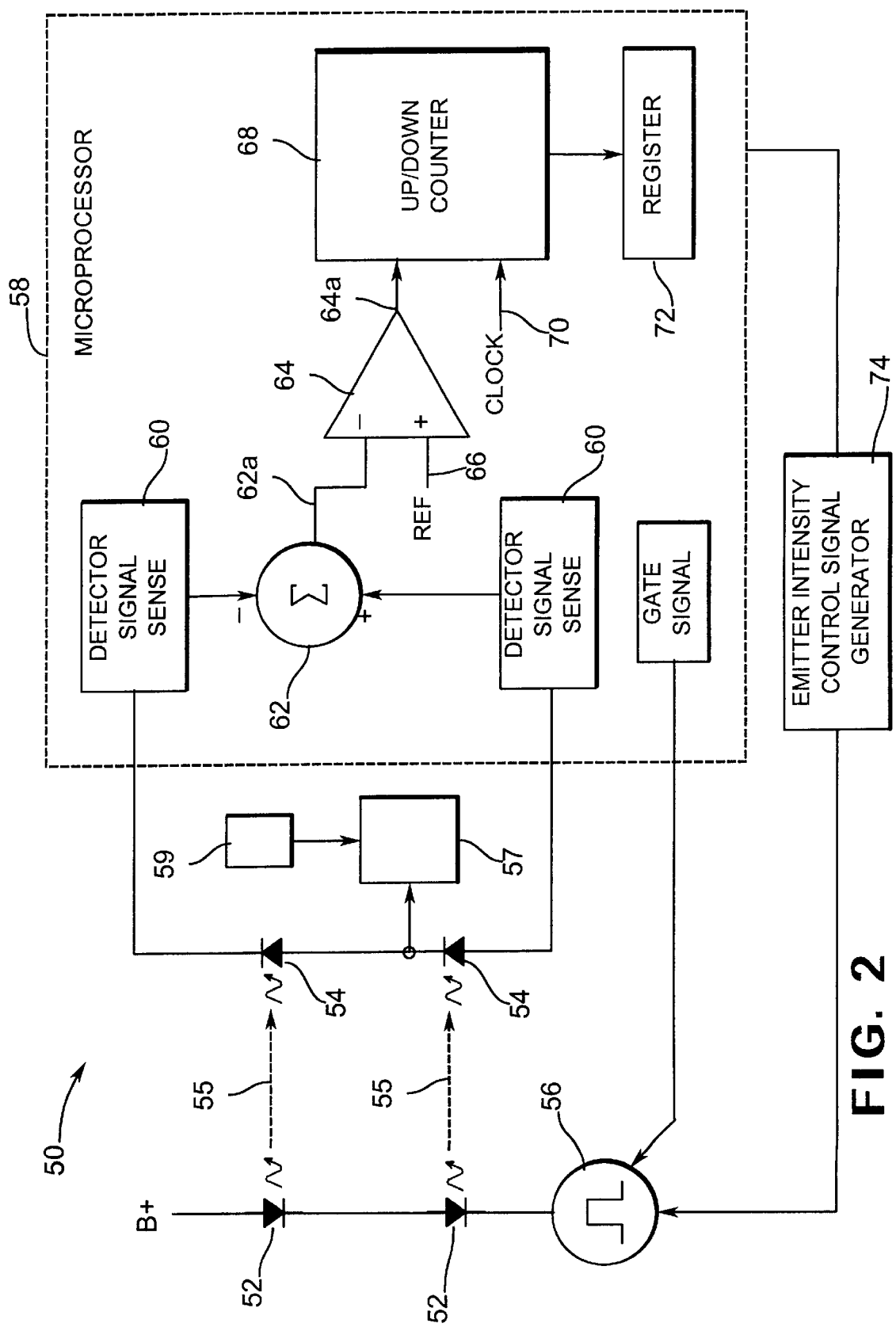
FIG. 2 is a block diagram of the automatic intensity control unit for use in the moisture sensor illustrated in FIG. 1 in accordance with the invention.

Referring now to FIG. 2, a block diagram of an automatic intensity control unit for use in a moisture sensor is illustrated generally at 50. A pair of moisture sensor emitters 40 communicate with a pair of moisture sensor detectors 44 by emitter signals 42 for detecting moisture on the glass surface as described above. An emitter driver 56 is connected to the emitters 40 for providing power to the emitters. The amount of power provided to the emitters determines the amplitude or intensity of the emitter signals 42. In the preferred embodiment, described in detail below, the emitter driver 56 is a current source which provides current to the emitters 40 and the amount of current provided by emitter driver 56 determines the intensity of the emitter signal 42.

The detectors 44 are coupled with the emitters as described above for receiving at least a portion of the emitted signals 42. The detectors 44 respond to the received emitter signal 42 by providing a detector signal representing the intensity of the received emitted signal. In the preferred embodiment, the detectors are photodiodes which allow current to flow when the detectors receive the emitted signals 42. The intensity of the emitter signal 42 received by the detectors determines the amount of current passing through the photodiodes. The detector signals are also sent to the moisture sensor signal processing circuit 57 which processes the detector signals to determine the amount of moisture on the glass surface.

The automatic intensity control unit 50 further includes a digital microcomputer 58 for manipulating the detector signals. Detector signal sense circuits 60 are connected to the detectors 44 for sensing the detector signals. The detector signal sense circuits 60 are preferably analog to digital converters which are known in the art. The analog to digital converters are preferably implemented by the microcomputer 58 in a known manner to provide digital signals representing the intensity or amplitude of the analog detector signals. In the preferred embodiment, the analog to digital converters provide a digital representation of the amount of current flowing through the photodiodes 44. Alternatively, the detector sense circuits may by any other known circuits for sensing the detector signals and providing digital representations of the amplitudes of the detector signals to the microcomputer 58 for further manipulation. The detector sense circuits may be implemented by the microcomputer 58 or alternatively by stand alone circuits (not shown).

The digital output of the analog to digital converters comprising the detector signal sense circuits 60 are connected to a summer 62. The summer 62 is preferably a known digital summer implemented by software within the microcomputer 58 in a known manner. The summer 62 produces a digital signal at the summer output 62a representing the sum of the amplitudes of the detector signals as sensed by the detector signal sense circuits 60.

The summer output 62a is connected to an input of a comparator 64. A reference signal shown at 66 having a predetermined reference level is also supplied to an input of the comparator 64. The comparator 64 is preferably implemented digitally by the microcomputer 58 in a known manner. The comparator output 64a is connected to an up/down counter 68. The up/down counter 68 is preferably implemented within the microcomputer in a known manner. The up/down counter 68 is clocked by a regularly repeating clock pulse at 70 which is preferably generated by the microcomputer 58. The up/down counter 68 counts between 0 and an upper threshold which is preferably 128, although any suitable upper threshold can be used. The number output by the up/down counter 68 is stored in a register 72 within the microcomputer 58.

The microcomputer 58 is connected to an emitter intensity controller 74 which provides an intensity control signal to the emitter driver 56. The intensity control signal determines the intensity of the emitted signal 42. The emitter intensity controller 74 preferably provides a control voltage to the emitter driver 56. The amplitude of the control voltage preferably controls the intensity of the emitter signal 42. Alternatively, the emitter intensity controller 74 may provide any other suitable signal to the emitter driver 56 to control the intensity of the emitter signal 56 in a known manner.

Figure 3:
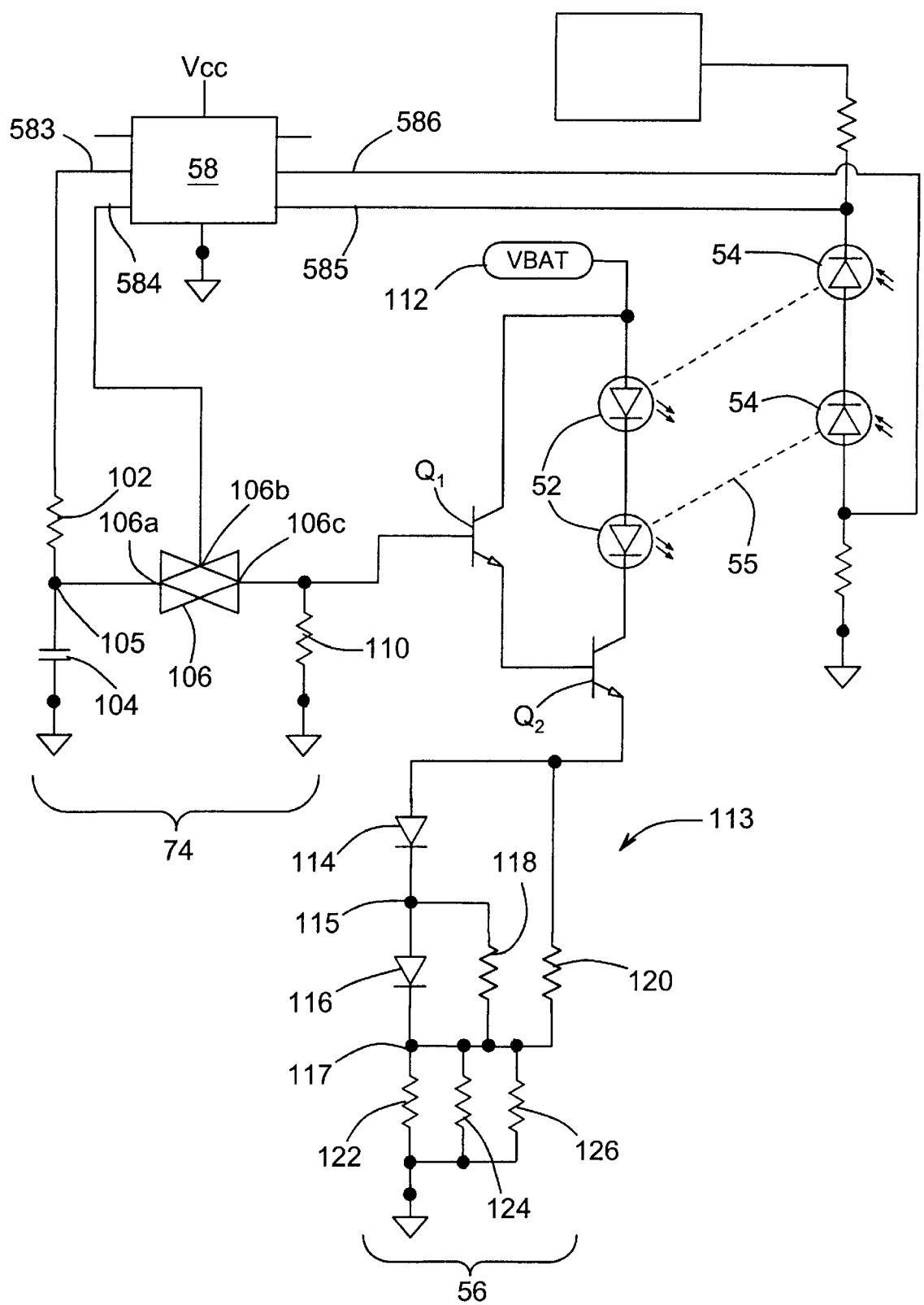
FIG. 3 is a schematic representation of the automatic intensity control unit illustrated in FIG. 2 in accordance with the invention.

Referring now to FIG. 3, electrical schematic representations of the emitter intensity controller shown generally at 74 and the emitter driver circuit shown generally at 56 are illustrated. The microcomputer 58 includes a first digital input-output driver or I/O pin 583 connected to a resistor 102, and the resistor is connected to capacitor 104 which is connected to ground. The junction 105 between the resistor 102 and the capacitor is connected to the input 106a of a gated switch 106.

The microcomputer 58 includes a second I/O pin 584 which provides a regularly repeating clock pulse to the gate input 106b of the gated switch 106. A resistor 110 having a relatively high resistance is connected between the output of the switch 106b and ground. The switch output is also connected to the input of the emitter driver 56 for providing a control voltage thereto.

The emitter intensity controller 74 provides the emitter intensity control signal, preferably a control voltage, to the emitter driver for determining the intensity of the emitter signal 42. The amplitude of the voltage of the emitter intensity control signal is determined by the value of the number output by the up/down counter 68. This number is stored in the register 72 and hereinafter call LED_LEVEL. As described above, LED_LEVEL has a value that ranges from 0 to 128. The LED_LEVEL value is stored in the register 72 until the output of the counter changes, at which time the new number will be stored in the register as LED_LEVEL.

The first I/O pin 583 can assume one of three states, including: a HIGH state in which the I/O pin 583 is pulled to 5 volts, a LOW state in which the pin is pulled to ground or 0 volts, and a TRISATE in which the pin assumes a high impedance, or is essentially left open.

Between the periodic adjustments to the control voltage which occur when the gated switch 106 is clocked by the microcomputer 58, the first I/O port 583 is in TRISTATE mode. During this time, the voltage on the capacitor 104 does not increase or decrease. A short time before the gate pulse, the first I/O port 583 is changed to a LOW state by software in the microcomputer 58. The first I/O port 583 remains in the LOW state for a first time interval determined by the value of LED_LEVEL. Preferably, the first I/O port 583 remains in the LOW state for (128—LED_LEVEL) microseconds. The capacitor 104 discharges slightly through the first I/O port 583 while the port remains in the LOW state.

Immediately thereafter, the first I/O port 583 is held to the HIGH state by software in the microcomputer for a second time interval of LED_LEVEL microseconds. During the second time interval, the capacitor 104 charges slightly. The time constant formed by resistor 102 and capacitor 104 is much greater than 128 microseconds, and thus the RC combination of 102 and 104 will average out the voltages attained during the first and second time intervals.

Put mathematically:

control voltage=5V×(LED_LEVEL/128)

As LED_LEVEL is permitted to range from 0 to 128, the control voltage at the input of the switch 106 will range from 0 to 5V. The above algorithm is implemented by the microcomputer 58.

The gated switch 106 then converts the dc control voltage across capacitor 104 into a voltage pulse across resistor 110 when the switch 106 is closed during the pulsed gate signal at 106b. The resistance of resistor 110 is large so that it does not present a significant load to the emitter intensity controller when the switch 106 is open. The emitter intensity controller 74 is implemented cost effectively using a simple microcomputer 58, software and few electrical components. The emitter intensity controller 74 may alternatively be implemented using a Digital to Analog converter, a Pulse Width Modulator, or any other known method of providing a control voltage having a predetermined amplitude to the emitter driver.

The emitter driver 56 includes a first transistor Q1 having a base connected to the output of the gated switch 106. The collector of Q1 is connected to the power supply 112, and the emitter is connected to the base of a second transistor Q2. The collector of Q2 is connected to a series connection of the signal emitters 56 which are connected to the power supply 112.

A load network 113 is connected to the emitter of Q2. The load network 113 includes a diode 114 connected to the emitter of Q2 and a first junction 115. A second diode 116 is connected between the first junction 115 and a second junction 117. A resistor 118 is connected between the first and second junctions 115, 117 in parallel to the second diode 116. A resistor 120 is connected to the emitter of the second transistor Q2 and the second junction 117. A group of three resistors 122, 124 and 126 are connected between the second junction 117 and ground. Each of the three resistors 122, 124 and 126 has a value of 10 ohms.

The transistor Q1 is configured as a unity gain voltage follower and transistor Q2 is configured as a voltage-to-current converter. The voltage at the emitter of Q2 will track the voltage at the gated switch output 106c across resistor 110. Thus configured, Q1 and Q2 will cause the emitter intensity control voltage to be applied to the load network.

Because of the high current gain or Beta of Q2, the current flowing to the base of Q2 is essentially zero, and the current flowing through the load network 113 will also flow through the moisture sensor emitters 40 and the collector of Q2. Therefore, the characteristics of the load network 113 determine the transfer function of the voltage to current converter. The amplitude of the control voltage applied to the emitter driver 56 and the transfer function of the voltage to current converter in turn determines the amount of current flowing through the emitters 40 and the intensity of the emitter signals 42.

For small values of control voltage less than the cut-in voltage of the first diode 114, the current flowing through the diodes is small and the effective resistance of the loading network is just the value of the second resistor 120 plus the aforementioned parallel combination of resistors 122, 124 and 126, or about 50 ohms. The voltage to current transfer function of the voltage to current converter will therefore have a slope of approximately (1/50) Amp per Volt for these small voltage inputs.

For slightly larger voltage inputs, the cut-in voltage of the first diode 114 is exceeded, but the cut in voltage of the second diode 116 is not yet reached. Therefore, little current will flow through the second diode 116 and it may be though of as an open circuit. Thus, the slope of the transfer function is set by resistors 118, 120, and is a somewhat larger value of (1/15) Amps per Volt. As the voltage input gets larger yet, both diodes 114 and 116 conduct, and the parallel combination sets the slope at a still larger (1/3.3) Amps per Volt. Each of the diodes begins to conduct gradually with increasing input voltage, smoothing the transition between breakpoints. The slope of the voltage to current transfer function of the voltage to current converter increases exponentially with larger voltage inputs.

Thus configured, the emitter driver 56 exhibits an exponential response to the emitter intensity control signal. Linear increases in the emitter intensity control signal produce exponential increases in the intensity of the emitter signals 42, while linear decreases in the emitter intensity control signal produce exponential decreases in the intensity of the emitter signals. The exponential response of the emitter driver 56 to the emitter intensity control signal reduces the response time of the automatic intensity control circuit 10.

Furthermore, the exponential response of the automatic intensity control circuit permits the system to have a very wide dynamic range. This is important because the range of power (herein determined by the emitter driver supplied current) that must be provided to the emitters 40 for consistent operation of the rainsensor on IR absorbing glass verses clear glass varies by a factor of over 50. A system capable of producing the high current pulses (as much as 0.5 amps) required for use with solar control glass would normally have trouble producing the small current pulses (about 8 mA) required for operation with clear glass. This can cause noise, stability, and quantization problems with typical control systems. The exponential current source, however, insures that a single-bit change in counter value represents about the same percentage shift in current pulse amplitude over the entire range of operation. The servo of the invention has been found to work well on the entire range of glass transmittances employed in automotive windshields.

Figure 4:
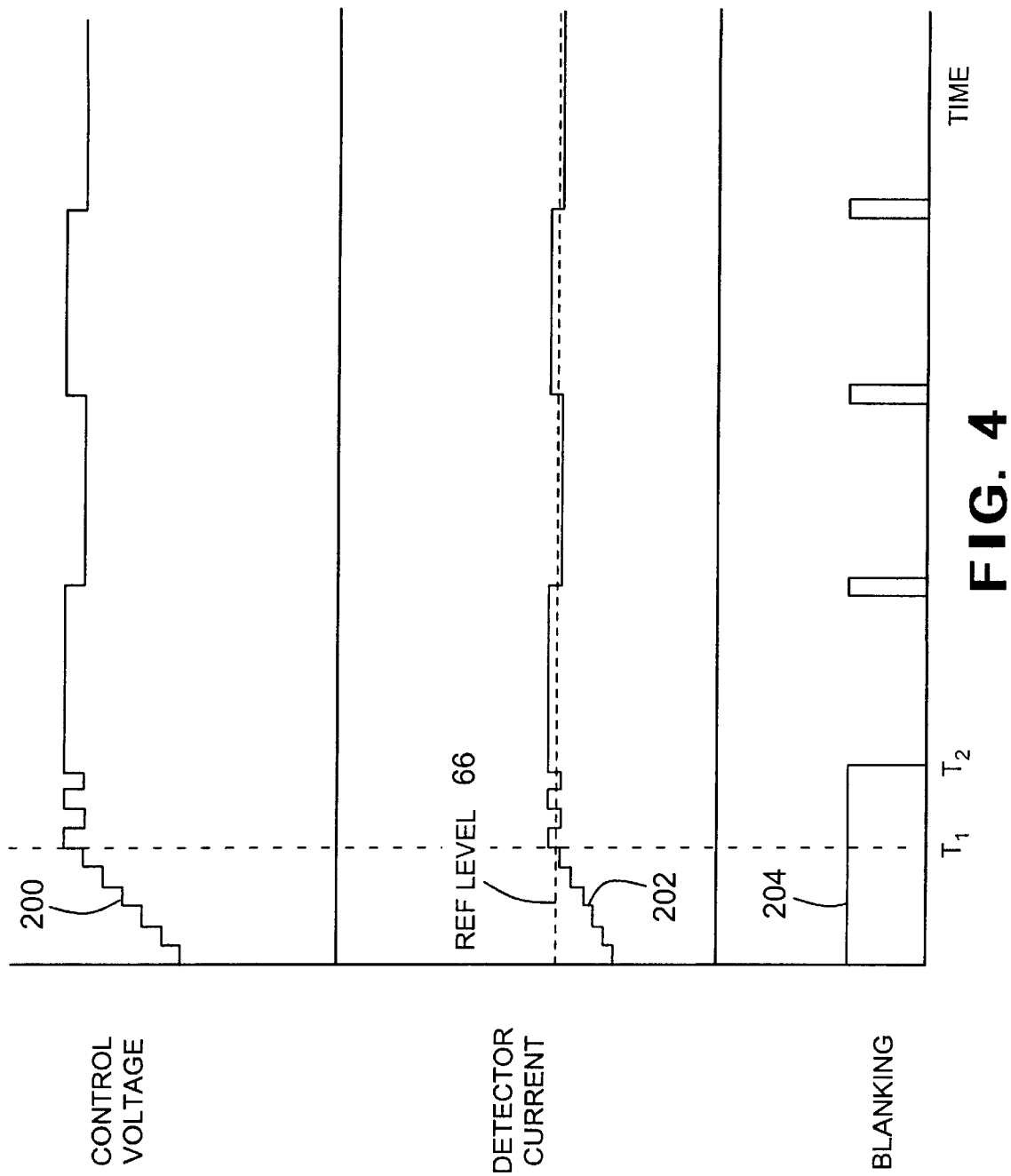
FIG. 4 is a graph showing the emitter intensity control voltage, the detector current and the blanking pulse over time in accordance with the invention.

Referring now to FIGS. 2 and 4, the operation of the automatic intensity control unit 50 shall now be described. Upon power-up of the moisture sensor 10, a nominal LED_LEVEL value is chosen by the microcomputer 58. The emitter intensity control signal generator 74 provides the emitter driver 56 with a nominal initial emitter intensity control signal voltage shown at 200 in the top graph of FIG. 4. In this illustrated example, the moisture sensor 10 is used on an infra red radiation absorbing solar control glass for use in vehicle windshields as described above. The emitter driver 56 receives the initial control voltage and produces an emitter signal 42 when clocked as described above. However, much of the weak initial emitter signal 42 is absorbed by the glass. The photodiode detectors 44 receive the reflected emitter signals creating the detector currents as described above.

The microcomputer also takes a second reading of the detector current for each photodiode when the emitter driver current pulse is not present, to read the quiescent effects of light on the photodiodes. The effects of light are linearly subtracted off of the detector signals and the resulting signal is representative of the amplitude of the received emitter signal. Digital representations of the resulting detector signals are produced by the detector sense circuits 60 as described above. The digital representations are summed by the digital summer 62.

The digital representations of the summed photodiode detector currents are compared to the predetermined reference level provided to the comparator input at 66. The amplitude of the reference level 66 is set equal to the desired amplitude of the detector signal for the optimum performance of the moisture sensor.

Since the summed detector signal at the comparator 64 is lower than the reference signal, the output of the comparator 64 is low. The low comparator signal is received by the up/down counter 68. When the counter 68 is clocked by the microcomputer at 70, the low input signal causes the counter 68 to count up.

The emitter intensity control signal voltage is increased in the manner described above, which in turn causes emitter driver current to rise as well. With each clock pulse the control voltage 200 rises linearly and the emitter driver current rises exponentially thereby increasing the intensity of the emitter signal 42 exponentially. After a short time at $T_1$, the summed detector currents 202 exceed the reference level 66, causing the comparator 64 to produce a high output. The high output provided to the counter 68 causes the counter to decrease at the next clock pulse 70. The decrease in the LED-LEVEL value causes the emitter intensity control voltage 200 to drop which reduces the emitter driver current. The lower emitter driver current produces a drop in the intensity of the emitter signal 42 which causes the detector current 202 to drop below the reference level 66 thereby increasing the intensity of the emitter signal. The received emitter signal will continue to oscillate above and below the reference level for the remainder of the power-up interval ending at time $T_2$.

At power up, the microcomputer clocks the counter frequently for a brief period allowing the emitter intensity to reach a steady state. Thereafter, the microcomputer clocks the counter infrequently, such as at ten-second intervals so that the automatic intensity control signal provided to the emitter driver is allowed to change only one level every ten seconds.

Each time the automatic intensity control signal changes levels, the moisture sensing circuitry of the moisture sensor amplifies the change in the detector signal which can be confused as sensed moisture. To prevent this, the automatic intensity control unit includes a blanking signal generator (shown at 59 in FIG. 2) for providing a blanking signal to the moisture sensing circuitry. During the time the blanking signal is received by the moisture sensing circuitry, the detector signal information is ignored by the moisture sensing circuitry to prevent the false detection of moisture created by the changing emitter signals. The blanking signal is provided during start up until the detector signal reaches the reference level. Thereafter, the blanking signal is provided for a brief period, such as one second, when the counter is clocked to receive the comparator output signal. Therefore, the automatic intensity control circuit does not interact with the moisture sensing circuitry to create false moisture sense information.

Control voltage reaches an appropriate range of current quickly within the power-up interval, which lasts about one second. Thereafter, and changes in efficiency of the optical system are modest; the IR transmittance of the glass, for example, is not prone to fluctuation. Thus, after the power up interval, the microcomputer clocks the counter only infrequently, at ten-second intervals. In normal operation, therefore, the servo permits adjustment only every ten seconds. Software within the microcomputer ignores any rain data for a brief period during the servo adjustment, as step changes in received intensity may be sensed as a rain event.

The automatic intensity control unit of the rainsensor is not a classic linear control system; it does not generate a continuous error signal. Rather, the control signal can assume only two discreet states; it may only increase or decrease the output of the emitter driver 56. Such a strategy has a characteristic that there is no "just right" level that will cause the moisture control device 50 to stop changing the intensity of the emitter signal 42. Instead, the automatic intensity control will constantly readjust the emitter so that is alternates between being just above and just below the ideal level. In this fashion, the received signal intensity stays very close to the ideal set point at all times. Although there will always be a steady-state error between the actual emitter intensity and the desired emitter intensity (as represented by the reference level 66, the error is small and is not a disadvantage in the rainsensor.

Because the microcomputer clocks the counter frequently during the power-up interval, the power-up settling time of the system is rapid. Once powered up, the infrequent adjustment by the automatic intensity control assures that it does not interact with rain or sunlight signals. This changing behavior is an advantage over classical control systems, which must select a compromise response time for both initial and steady state response.

The present invention uses few parts, and is thus inexpensive. It does, however, hold the received intensity very close to the desired level. This permits the moisture sensor to act consistently in different installations, with minimum unit-to-unit variation. It powers up and settles out quickly, and does not adversely interact with the moisture sensing circuitry of the sensor system. Further, the exponential characteristic of the emitter driver permits the system to operate with excellent accuracy and stability over the entire range of available automotive windshield glass.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An automatic intensity control unit for a moisture sensor, said moisture sensor including one or more signal emitters for generating one or more emitter signals influenced by the presence of moisture on the surface of a transparent material and one or more detectors for receiving said one or more emitter signals and communicating with moisture sensing circuitry for determining the presence of moisture, said automatic intensity control unit comprising:

a comparator connected to said one or more detectors for comparing the intensity of said one or more emitter signals received by said one or more detectors with a predetermined reference signal;

a counter communicating with said comparator and having a counter output which increases when the intensity of said one or more emitter signals received by said one or more detectors is less than said reference signal and decreases when the intensity of said one or more emitter signals received by said one or more detectors is more than said reference signal;

an emitter driver connected to said one or more emitters for providing power to said one or more emitters in an amount which determines the intensity of said one or more emitter signals, wherein said emitter driver exponentially increases the emitter intensity with linear increases in said emitter control signal and exponentially decreases the emitter intensity with linear decreases in said emitter control signal, and an emitter intensity control signal generator connected to said emitter driver for providing an emitter intensity control signal for increasing the intensity of said one or more emitter signals when said counter output increases and decreasing the intensity of said one or more emitter signals when said counter output decreases.

2. The automatic intensity control unit defined in claim 1 wherein said emitter intensity control signal generator produces a linearly increasing voltage for increasing the intensity of said one or more emitter signals and a linearly decreasing voltage for decreasing the intensity of said one or more emitter signals.

3. The automatic intensity control unit defined in claim 2 wherein said emitter intensity control signal generator includes comprises a digital output means and a filter means.

4. The automatic intensity control unit defined in claim 3 wherein said filter means includes an RC circuit having a resistance value and a capacitance value.

5. The automatic intensity control unit defined in claim 4 wherein said emitter driver provides current to said one or more emitters, wherein the amount of said current determines the intensity of said one or more emitter signals.

6. The automatic intensity control unit defined in claim 5 wherein said emitter driver includes a voltage controlled current source for providing said current to said one or more emitters.

7. The automatic intensity control unit defined in claim 1 wherein said emitter driver voltage controlled current source includes a load resistance for determining the amount of current provided to said emitters for a given emitter intensity control signal voltage, wherein said load resistance varies exponentially in response to linear changes to said emitter intensity control signal voltage so as to affect an exponential change in the amount of current provided to said emitter.

8. The automatic intensity control unit defined in claim 1 further including a blanking signal generator for providing a blanking signal to said moisture sensing circuitry for causing the moisture sensing circuitry to ignore the detector signal information thereby preventing the false detection of moisture created by the changing emitter signals.

9. The automatic intensity control unit defined in claim 2 wherein said emitter intensity control signal generator comprises a digital output means, said digital output means operating in the TRISTATE mode, and a filter means.

10. A moisture sensor for determining the presence of moisture on the surface of a transparent material and controlling the actuation of a moisture removal system accordingly said moisture sensor comprising:

one or more emitters for generating one or more emitter signals which are influenced by the presence of moisture on the surface of a transparent material;

one or more detectors for receiving said one or more emitted signals, a comparator connected to said one or more detectors for comparing the amplitude of said one or more emitter signals received by said one or more detectors with a predetermined reference signal;

a counter communicating with said comparator and having a counter output which increases when the amplitude of said one or more emitter signals received by said one or more detectors is less than said reference signal and decreases when the amplitude of said one or more emitter signals received by said one or more detectors is more than said reference signal;

an emitter driver connected to said one or more emitters for providing power to said one or more emitters in an amount which determines the intensity of said one or more emitter signals, wherein said emitter driver exponentially increases the emitter intensity with linear increases in said emitter control signal and exponentially decreases the emitter intensity with linear decreases in said emitter control signal; and an emitter intensity control signal generator connected to said emitter driver for increasing the intensity of said one or more emitter signals when the counter output increases and decreasing the intensity of said one or more emitter signals when said counter output decreases.

11. The moisture sensor defined in claim 10 wherein said emitter intensity control signal generator produces a linearly increasing voltage for increasing the intensity of said one or more emitter signals and a linearly decreasing voltage for decreasing the intensity of said one or more emitter signals.

12. The moisture sensor defined in claim 11 wherein said emitter intensity control signal generator comprises a digital output means and a filter for producing an emitter intensity control signal voltage determined by the value of said counter output.

13. The moisture sensor defined in claim 11 wherein said emitter driver provides current to said one or more emitters, wherein the amount of said current determines the intensity of said one or more emitter signals.

14. The moisture sensor defined in claim 13 wherein said emitter driver includes a voltage controlled current source for providing said current to said one or more emitters.

15. The moisture sensor defined in claim 14 wherein said emitter driver voltage controlled current source includes a load resistance for determining the amount of current provided to said emitters for a given emitter intensity control signal voltage, wherein said load resistance varies exponentially in response to changes to said emitter intensity control signal voltage.

16. The moisture sensor defined in claim 10 further including moisture sensing circuitry communicating with said one or more detectors for determining the presence of moisture and a blanking signal generator for providing a blanking signal to said moisture sensing circuitry for causing the moisture sensing circuitry to ignore the detector signal information thereby preventing the false detection of moisture created by changing the emitter signals.

17. The moisture sensor defined in claim 11, wherein said emitter control signal generator comprises a digital output means, said digital output means operating in the TRISTATE mode, and a filter for producing an emitter intensity control signal voltage determined by the value of said counter output.

\* \* \* \* \*